United States Patent [19]
DeBono

[11] Patent Number: 5,782,522
[45] Date of Patent: Jul. 21, 1998

[54] REMOVABLE SECURABLE CARGO AREA COVER ESPECIALLY FOR USE ON UTILITIES AND PICK-UP TRUCKS

[76] Inventor: Gregory John DeBono, P.O. Box 1071, Broken Hill, New South Wales 2880, Australia

[21] Appl. No.: 672,091

[22] Filed: Jun. 27, 1996

[30] Foreign Application Priority Data

Jun. 29, 1995 [AU] Australia ................. PN3864

[51] Int. Cl.[6] ........................... B60P 7/02
[52] U.S. Cl. ........................... 296/100
[58] Field of Search .......................... 296/100, 202, 296/210, 213, 229.1; 114/201 R

[56] References Cited

U.S. PATENT DOCUMENTS

| | | | |
|---|---|---|---|
| 3,514,152 | 5/1970 | Hermon | 296/100 |
| 4,261,611 | 4/1981 | Barry et al. | 296/100 |
| 4,832,394 | 5/1989 | Macomber | 296/100 |

*Primary Examiner*—Jesus D. Sotelo
*Attorney, Agent, or Firm*—Finnegan, Henderson, Farabow, Garrett & Dunner

[57] ABSTRACT

A securable and removable cover for vehicle with an open cargo area such as a pick-up truck that has a front wall, tailgate and two side walls, the cover comprising of two panels that are hingedly attached to each other at their inside edge along a hinge connection and which span across the cargo area so as to enclose it. The covers generally span across from the tailgate to the front wall with the outer edge of each panel resting on top of a side wall. A securing means then secures the outer edge of each panel to the side wall on which it is resting when the panel is in a resting position. So as to prevent the cover from being moved vertically there is a restraining means engaging the cover and preventing it from being moved vertically when at least one panel is lying flat across the cargo area. To remove the cover, both panels are folded upwards until the restraining means is disengaged and the cover is then simply lifted upwards removing it from the pick-up truck. Further improvements may include restricting means that prevent the cover front sliding when at least one of the panels is closed.

18 Claims, 13 Drawing Sheets

REMOVABLE SECURABLE CARGO AREA COVER ESPECIALLY FOR USE ON UTILITIES AND PICK-UP TRUCKS

FIELD OF THE INVENTION

The present invention relates to a new and improved cover for the bed of a utility, a pick-up truck or trailer of the but not limited to the flatbed type. These types of vehicles and trailers commonly possess an open cargo area defined by a flatbed or tray surrounded by a pair of spaced-apart vertical side walls extending upward from the tray, a transverse front wall and an upward rear wall or tailgate. In a vehicle the front wall is usually located just behind the vehicle cab while the rear tail gate is hinged at the bottom so as to swing outwards and downwards into a position allowing easier access to the cargo area. Alternatively, some tail gates are designed to be hinged sidewardly to one of the side walls and allow access into the cargo area by swinging outwardly and sidewardly. This invention is for a movable and securable cover that may be removable from a cargo area and yet which when in use is securable so as to prevent unauthorized access into the cargo bay as well as securable against the unauthorized removal of the cover itself.

In the rest of the specification whilst reference is only made to pick-up trucks it is to be understood that it equally well applies to utilities, trailers or any other open cargo area defined by a bed and side walls.

DESCRIPTION OF THE PRIOR ART

Because the rear cargo area of pick-up trucks is exposed to the weather it has been common practice to cover the load using covers such as tarpaulins or canvas. However, not only are these prone to water see page, they are susceptible to vandalism and do not protect the inside of the cargo area to theft. Furthermore, the covers themselves may be easily removed and thus are at risk of being stolen.

Numerous attempts have been made to provide a secure and weatherproof cover. However, simply providing fixed solid metal covers say which allows partial or total access to the cargo area severely restricts and inconveniences the use of the cargo area. The covers are difficult to remove and defeat the purpose of an open rear cargo space which normally allows loads of varying dimensions to be transported and where the covers need to be easily removable, or at least to allow easy access to the cargo area.

To this end a number of portable and secure covers have been designed but these usually require complicated locking arrangements to make them secure. Not only is this inconvenient but it renders the units expensive. In addition, it may be desirable to only have access to a certain portion of the cargo area, and although covers have been designed to that effect with a plurality of individual leaves they are then prone to be themselves easily removable when any one individual leaf is partially open for the security of the cover itself is somewhat compromised when any portion of it is in an open position.

It is also known for pick-up trucks to contain small securable and fixed items within certain areas of the cargo bed, such as tool chests. For convenience sake, these are located usually adjacent the rear wall of the cab. Many existing devices use slidable panels which make it difficult to only access the tool chest close to the cab wall without removing or opening all of the panels. In addition, these prior art devices which use sliding panels use sensitive roller bearings which are used to support the panels. Obviously, the more parts there are, especially moving parts, the more risk of mechanical failure as well as the necessity of increased maintenance.

Some covers may also use locks of the type that extend substantially outwardly from the body of the pick-up truck thus not only posing a threat of injury but allowing themselves to be damaged. Still other covers depend on the tail gate locking mechanism for their security thus relying only on one lock which is frequently used and thus prone to more risk of breakdown. Therefore, there is an inherent risk that if the lock of the tail gate is broken the cover will also not lock and thus be unusable. This means that unauthorized access and removal of the cover can be accomplished by only the manipulation of the tail gate lock.

Furthermore, existing covers tend to be quite bulky and may require several people to position and remove them, usually one person on each side, the disadvantages with this type of arrangement being obvious.

Other disadvantages in some secure covers include the necessity of difficult, laborious and expensive installation.

It is an object of this invention to overcome at least some of the aforementioned problems or to provide the public with a useful alternative.

This invention provides a reasonably secure cover for the otherwise open rear cargo area of a pick-up truck or a trailer or any other cargo area, the cover being portable and removable and yet offering good security not only for the interior of the cargo tray enclosed by the cover but for the cover itself.

SUMMARY OF THE INVENTION

Therefore in one form of the invention though this need not be the only or indeed the broadest form there is proposed a removable securable cover for use with a vehicle having an open cargo area defined by a tray and two pairs of substantially parallel side walls, said cover comprising;

two panels hingedly attached to each other at their adjacent edges along a hinge connection and spanning across the cargo area so as to cover it, the panels spanning across the first pair of side walls with an outer edge of one panel resting on top of one side wall of the second pair of side walls and the outermost edge of the other panel resting on top of the other one of the second pair of side walls;

a securing means securing the outer edge of each panel to the side wall on which it is resting;

a restraining means engaging the cover so as to prevent it from moving in an upright direction unless both panels are lifted to provide an inclined angle therebetween;

whereby with both panels extending over the cargo area and secured the cover is securably attached to the vehicle, with one panel extending over the cargo area and secured in place the other panel can be folded open about the hinge connection to expose at least a part of the open cargo area with the cover still securably attached to the vehicle, and whereby with both panels folded open about the hinge connection and extending upwardly the cover may be removed from the vehicle.

In preference the first restraining means comprises of a receiving lug located on each of the pair of walls against which the hinge connection abuts for receiving a locking-lug insertable portion that is bevelled and located at the extremes of the inside edge of each panel, the receiving lug having a mated bevelled entry for receiving said insertable portion.

Preferably the bevelled portions cause upon restraining action to induce drawing down of the panels onto the four walls into a tight sealing that assists in sealing of the cargo area as well as inhibiting any rattling motion.

In preference the cover further includes a restricting means to restrict the sliding of the cover when at least one of the panels is in a closed position.

Preferably the restricting means includes a first restricting means engaging the cover when at least one of the panels extends over the cargo area so as to prevent it from sliding in a direction substantially parallel to the hinge connection.

Preferably the first restricting means comprises of a lip on the receiving lug which engages the side of the locking-lug insertable portion when the panel extends over the cargo area.

Preferably the restricting means further includes a second restricting means engaging the cover when at least one of the panels extends over the cargo area so as to prevent it from sliding in a direction substantially transverse to the hinge connection.

In preference the second restricting means includes at least one projection extending downwardly from the outer edge of each panels so as to engage the inside of the wall on which the outer edge of the panel is resting and prevent the cover from sliding in a direction substantially transverse to the hinge connection.

In preference the securing means is a key lock means for each panel to selectively lock the outer edge of the panel to the side wall on which it rests.

Preferably there is a sealing means extending circumferentially on the outer edges of the cover to provide a sealing means of the cover to the walls.

In preference the hinge connection means comprises of two hinges one attached to the first panel, the other to the second panel and attached to each other through a third.

In a further form of the invention there is proposed a securable removable cover for use with a vehicle such as a pick-up truck having an open cargo area defined by a tray and four walls, the four walls being two side walls, a front wall and a tailgate, said cover corresponding substantially in size to the width and length of the open cargo area the securable removable cover comprising:

at least two panels pivotally joined to each other by at least one hinge, the two panels extending across said open cargo area so as to enclose it, each of the at least two panels adapted so that at least a portion of it rests on top of at least one of the four walls when in a fully closed position said at least two panels being further adapted to be lockable to at least one of the four walls that each is resting on when in a fully closed position; and a restraining means positioned on at least one of the four walls in line with the at least one hinge and adapted to restrain the cover from moving in a vertical direction when at least one of the panels is in a fully closed position.

In preference the cover is only vertically movable when all of the leaves are in a substantially open position.

In preference the locking means is not externally accessible therefore provides security against unauthorized access to the cargo area. However, the locking means may also be secured by a securable arrangement such as an key operated lock thereby restricting access to authorized persons.

In preference the cover further includes supporting beams on the underside of the cover so positioned to fit in the internal perimeter of the cargo area so as to prevent the cover from sliding around in the horizontal plane or the plane of the cover.

In preference the cover includes angle brackets which are adapted to be fixedly attached to the outside underside perimeter of each leaf and further adapted to rest on top of the corresponding wall, this arrangement reducing the strength required of the edges of the cover and thus the thickness of the cover which is preferentially constructed of a strong material such as metal.

In preference the restraining means further includes a loop which prevents the cover from moving in a direction substantially in line with the hinge. Such an arrangement allows the tailgate to be more secure, for example, in a situation where there are two restraining means one on the front wall and the other on the tailgate, then even if the tailgate is unlocked, the lips on the two restraining means do not allow relative movement of the tailgate to the front wall when at least one of the leaves is in a fully closed position.

In preference the cover further includes a sheet of weatherproof and/or waterproof material which extends across the whole of the cover.

In preference each leaf is pivotally connected to a common central plate, this embodiment reducing the stress on any material covering the cover when the leaves are being opened and/or closed.

BRIEF DESCRIPTION OF THE DRAWINGS

For a fuller understanding of the nature and object of the invention reference should be had to the following detailed description taken in conjunction with the accompanying drawings in which.

DESCRIPTION OF EMBODIMENTS OF THE INVENTION

Referring now to the figures in detail there is shown a first embodiment in FIGS. 1-5 first embodiment of a cover 10 for covering a cargo area 11 of a truck (vehicle) 12. The cargo area 11 is defined by a tray 13 and two pairs of substantially parallel and spaced apart walls, namely side walls 14, 15 and front wall and rear wall (tailgate) 16, 17. The cover 10 in this first embodiment comprises of two panels 18, 19 that extend across and are supported by the front and rear walls 16, 17 with the outside edges 20 of both panels 18, 19 also supported by side walls 14, 15 respectively.

The two panels 18, 19 are hingedly connected to each other at their adjacent inside edges 21 by a hinge connection means 22 extending substantially parallel to the vehicle in longitudinal direction 23. As one can see in FIG. 1, when the panels 18, 19 lie flat on top of the four walls the cargo area 11 is enclosed and to gain access to the cargo area 11 one simply foldably opens either one or both of the panels about the hinge connection means 22, for example panel 18 in direction 24.

To prevent the cover 10 from moving in a vertical direction when either one or both of the panels 18, 19 are lying across the cargo area there is a first restraining means located at the pair of walls against which the hinge connection means 22 abuts. Thus in FIG. 1 the hinge connection means 22 abuts against the front and rear walls 16, 17. The first restraining means, seen in more detail in FIG. 2, comprises of a receiving lug 26 located on the front and rear wall for receiving a locking-lug insertable portion 27 that is bevelled and located at either end of the inside edge 21 of each panel, the receiving lug 26 having a mated bevelled entry for receiving said insertable portion 27. In addition the bevelled portions may cause upon locking action to induce the drawing down of the panels onto the four walls into a tight sealing that assists in sealing of the cover as well as inhibiting any rattling motion. The tight sealing may be assisted by providing a rubber seal 28 on the underside periphery of the cover.

When the panels are thus in a locked position, the first restraining means 25 prevents the panels from moving in the vertical direction 29. To remove the cover 10 from the truck both of the panels are folded so that they extend in an upright direction whereby the locking-lug insertable portion 27 disengages the receiving lug 26 and allows the cover 10 the be lifted vertically (seen in FIG. 3). As one can see, even if one of the panels of the cover 10 is in a closed position the cover is prevented from moving vertically. To assist in the securing of the cover there is a further locking means 34 that locks the outside edge 21 of each panel to the side wall on which it is resting. The locking means may be key operated and therefore assist in securing the cover to the truck.

To prevent the cover from sliding across the top of the truck walls there is a horizontal restraining means. The horizontal restraining means acts so as to prevent the cover from sliding in longitudinal direction 23 by a lip 31 on the receiving lug 26 that is engaged by the sides of the locking-lug insertable portion 27 when in a closed position. The lip 31 may be constructed on only the front wall of the truck this allowing the rear tailgate to still be opened when the cover is in the fully closed position. However, if the lip does exist on the receiving lug on the tailgate this further enhances the security of the tailgate and prevents it from being opened unless both panels are opened.

To prevent the cover from sliding across the side walls of the truck there are projections 32 positioned towards the outside edge 21 of each of the panels so as to engage the inside of the side panels when they are in a closed position and to provide a tight fit so that the panels do not slide across the truck. With such an arrangement one can see that the first restraining means 25 also acts so as to prevent the cover from sliding across the truck when one cover is open.

The two panels 20, 21 are made of a rigid material, but may be made of non-rigid material the latter construction then requiring a support frame. In the first embodiment the panels are made of a rigid material with the hinge connection means 22 seen in more detail in FIGS. 2-5 shown as a strip of thick rubber which provides both the necessary strength and flexibility to support the panels and hingedly connect them to each other, there being a supporting member 33 extending along the inside edge of the panels. Generally the panels are to be made of a metal or timber, whose particular sizes are chosen to suit the particular application. This it is envisaged that even strong metal sheeting may be used in circumstances where the panels may be used to support weight themselves.

A second embodiment of the invention shown in FIGS. 6-10. Keeping the same referencing number as above there is again shown a cover 10 extending in the longitudinal direction 23 of a truck. In this embodiment there is shown a supporting frame 40 extending around the periphery of the cover and designed to correspondingly fit in the internal perimeter defined by the four walls and thus minimize any movement of the cover 10 either across the truck or in the longitudinal direction when the cover 10 is in the closed position. The panels 18, 19 extend beyond the supporting frame 40 leaving a flange 41 which rests on top of the four walls but preferably not and provides support for the cover 10. Of course, the supporting frame 40 need not to be continuous in length (provided that tho panels are sufficiently supported). In fact it is only necessary to have a part of the frame acting against each of the four walls to prevent the cover from sliding around. In this case there being a part of the supporting frame acting against the front and rear walls there is no need for the lip 31 on the receiving lug 26. The addition of the supporting frame 40 is to strengthen the panels 18, 19 so that they may support more weight and to prevent sagging or buckling although as discussed later other types of supporting members may be used to effectively provide support.

In this second embodiment the hinge connection means is now a hinge with the panels accordingly positioned with their inside edges being much closer to each other. This construction also results in the locking-lug insertable portion 27.

Figure 1:
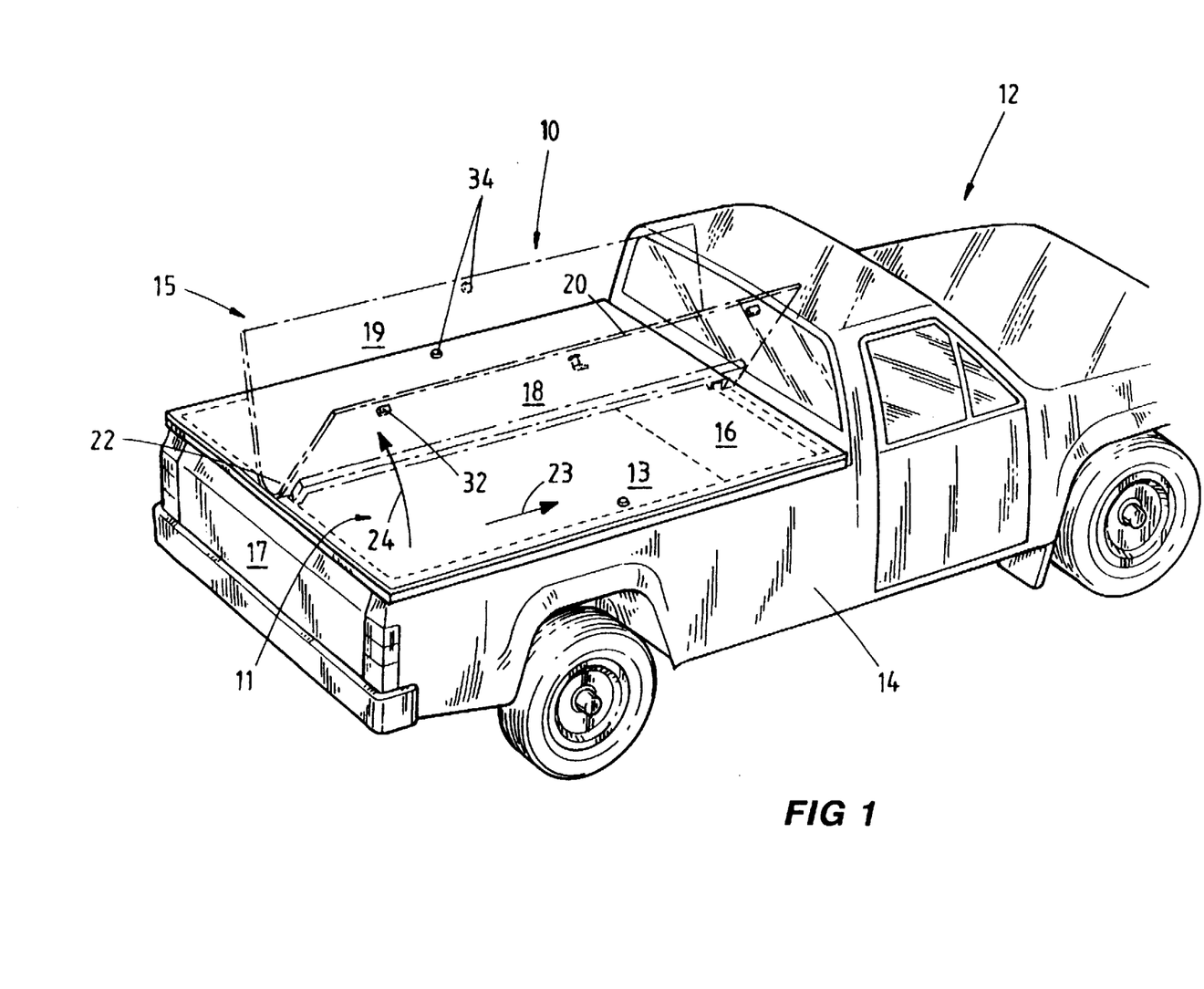
FIG. 1 is a perspective view of a first embodiment of a cover installed on a pick-up truck body when in a fully closed position and when in a partially open position (dashed lines), with the hinge connection means running parallel to the longitudinal axis of the pick-up truck, the cover consisting of two panels.
Figure 2:
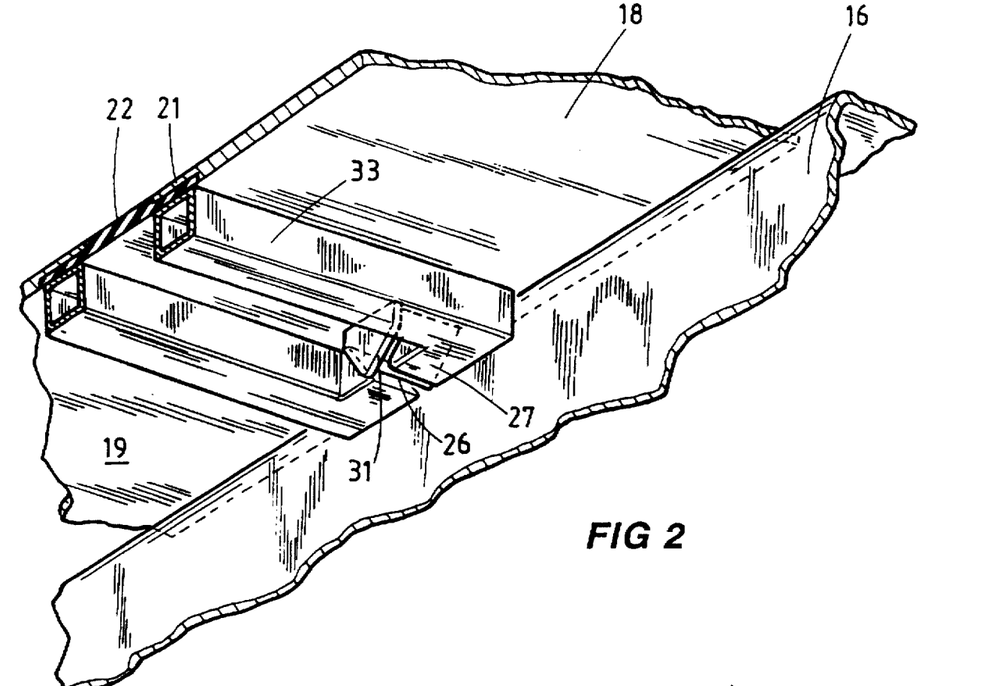
FIG. 2 is a partial underside perspective view of the cover of FIG. 1 when in a closed position.
Figure 3:
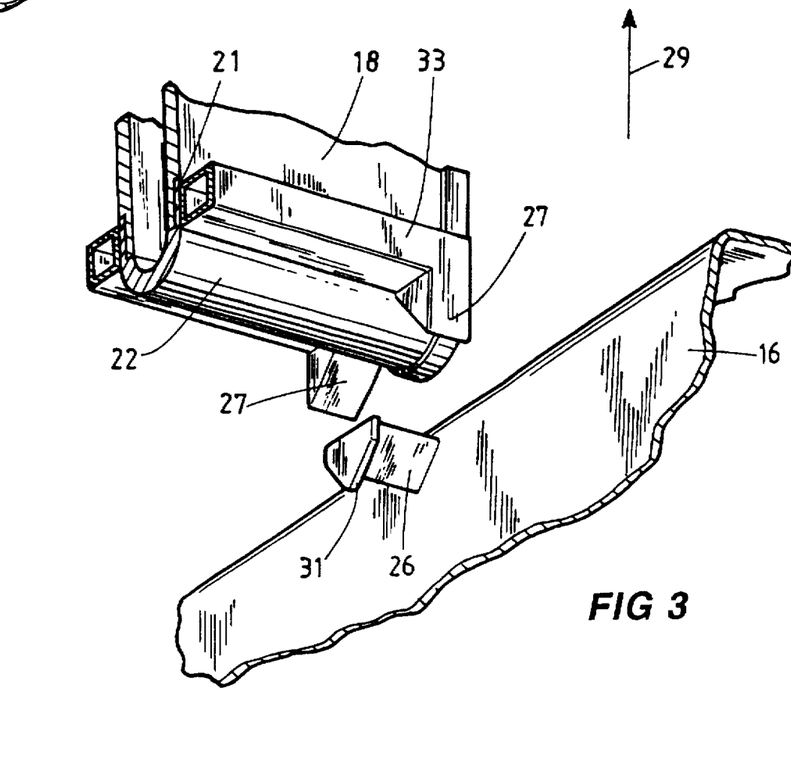
FIG. 3 is a partial underside perspective view of the cover of FIG. 1 when in an open position allowing its removal from the pick-up truck.
Figure 4:
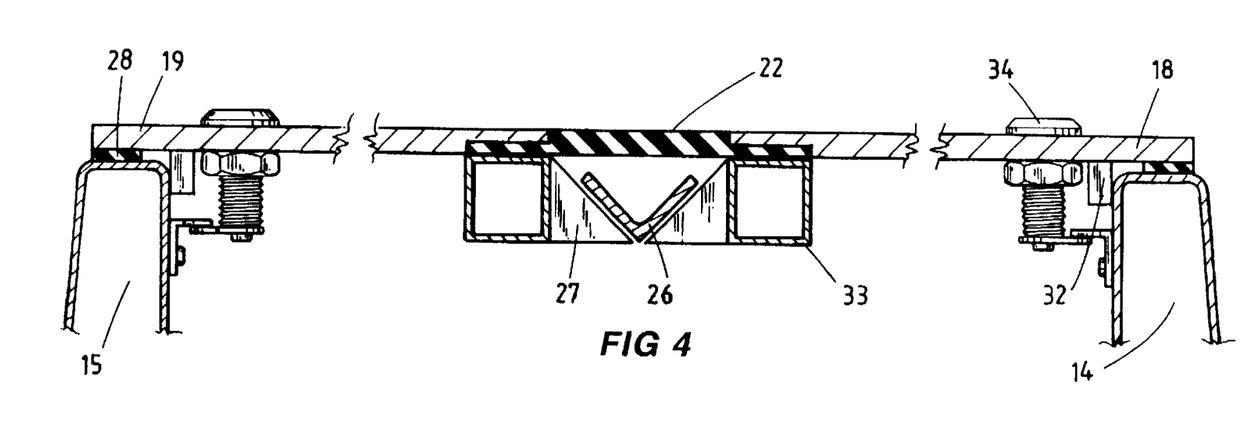
FIG. 4 is a cross-sectional view of the cover of FIG. 1 when in a closed position.
Figure 5:
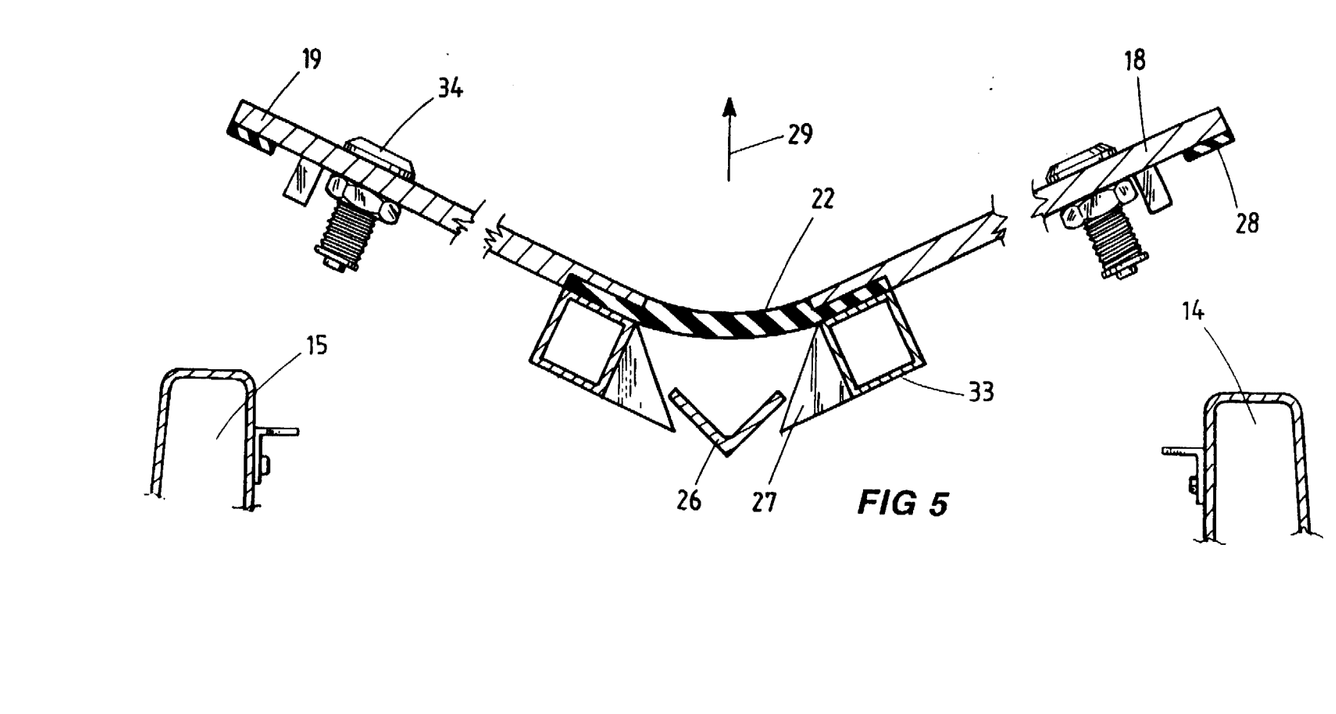
FIG. 5 is a cross-sectional view of the cover of FIG. 1 with both panels partially open.
Figure 6:
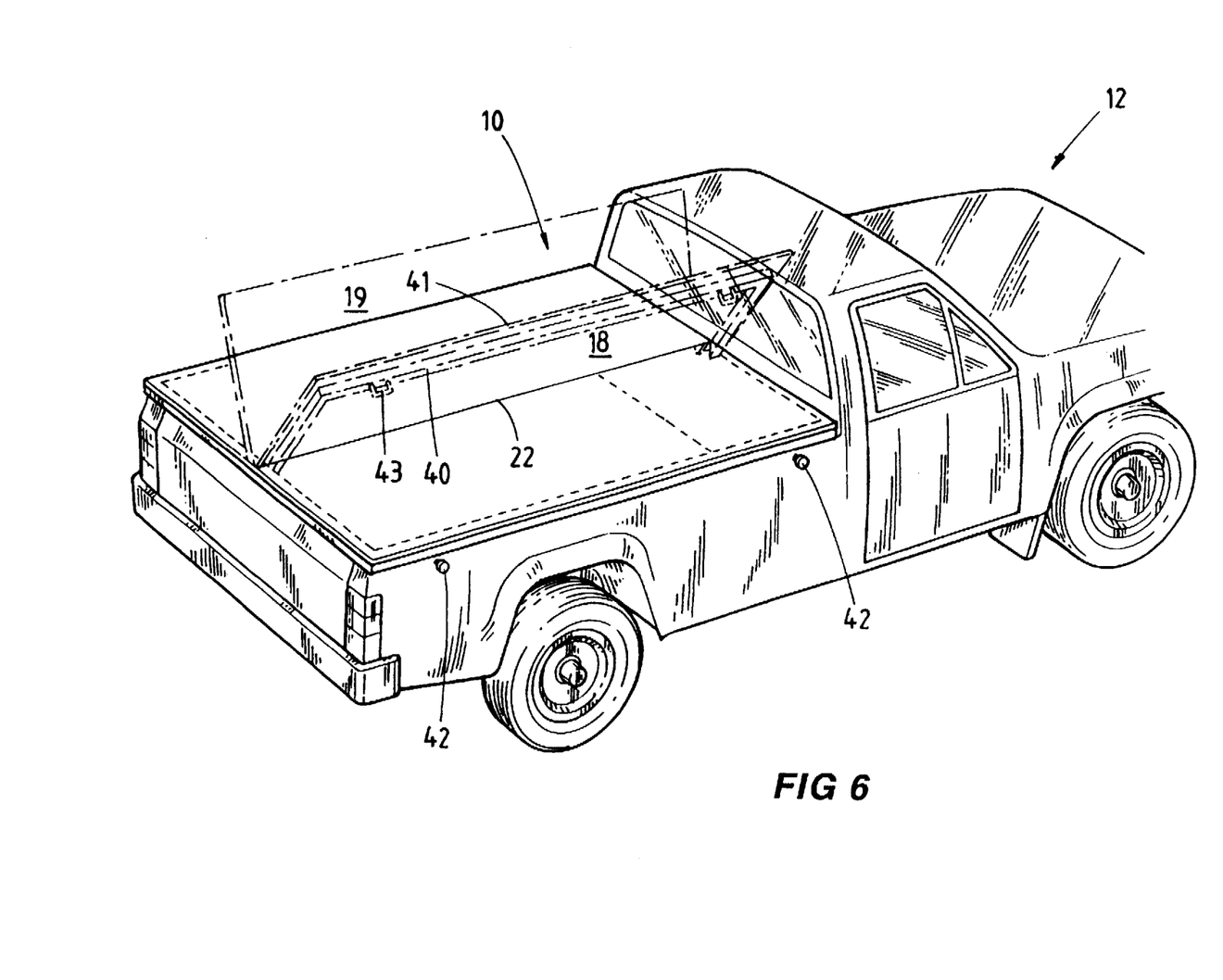
FIG. 6 is a perspective view of a second embodiment of a cover installed on a pick-up truck body when in a fully closed position and when in a partially open position (dashed lines), with the hinge connection means running parallel to the longitudinal axis of the pick-up truck, the cover consisting of two panels.
Figure 9:
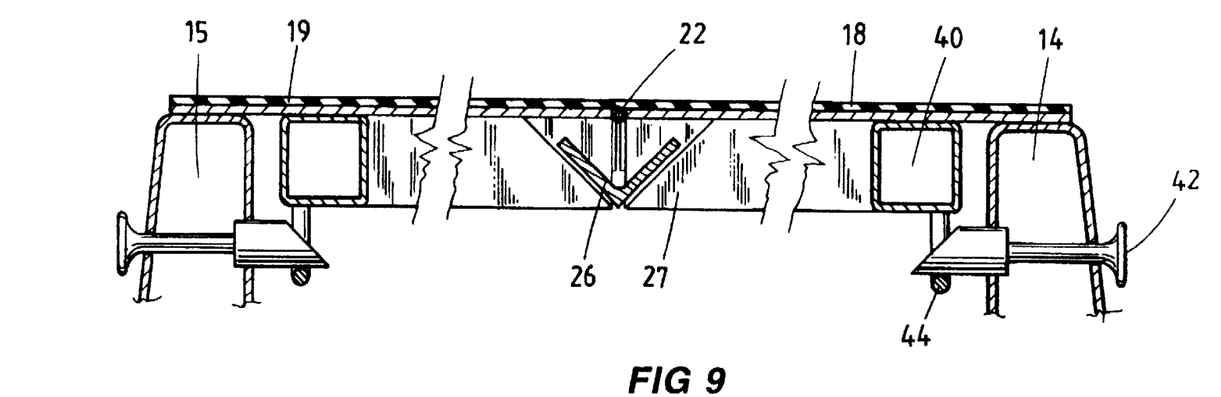
FIG. 9 is a cross-sectional view of the cover of FIG. 6 when in a closed position.
Figure 10:
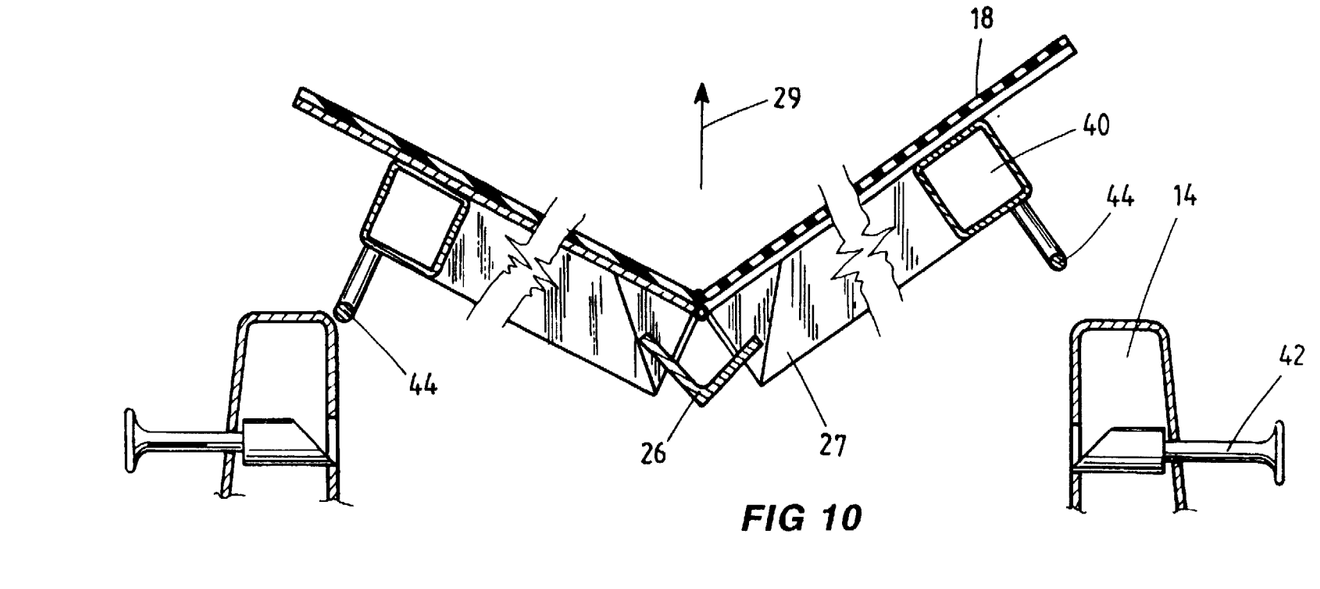
FIG. 10 is a cross-sectional view of the cover of FIG. 6 with both panels partially open.

Once again there is a first restraining means designed so that when at least one of the panels 18, 19 is in a closed position a locking-lug insertable portion 27 acts against a receiving lug 26 on both the front wall and the rear so that the cover 10 is restrained against moving vertically in direction 28. There two receiving lugs 26 are positioned opposite each other in line with the hinge connection means 22. When a panel is in a closed position it may be further locked in that position by a locking means which in this embodiment be simply a pin 42 fixedly attached to one of the side walls and engaging an aperture 43 on the supporting frame 40 as shown in FIG. 6 or a catch 44 as shown in FIGS. 9 and 10. Obviously this does not provide the same security as the locking means 34 against unauthorized access to the cargo area but it does provide protection for the cargo area against the elements which may be all that is required in some circumstance. Of course, there could also be a locking means associated with the pin in any event.

The receiving lug 26 is simply a triangular extrusion fixedly attached to the front and rear walls 16, 17. It is preferential to have one lug for both of the panels as although one could construct a lug for each panel. It is to be understood that depending on the orientation of the hinge connection means 22, the receiving lug may also be positioned on the side walls. In the case of multiple hinges running at right angles to each other there will also thus be multiple lugs in line with each hinge connection means with together with locking-lug insertable portions 27 on each panel 18, 19.

The shape of the receiving lug 26 and the locking-lug insertable portion 27 is not critical, but the shapes must allow for the cover to be removable in a substantially vertical direction (although the direction is only relative to the application and could vary well be sideways if the cover is used to act as a side wall say) when in an open position (only when all of the leaves must be in an open position) and must vertically restrain the cover 10 when either one of the panels 18, 19 is in a closed position. This can be accomplished with the receiving lug 26 having at least in part non-vertical surface and locking-lug insertable portion having at least in part co-operating non-vertical surface which engages the receiving lug 26 when a panel is in the closed position.

Figure 7:
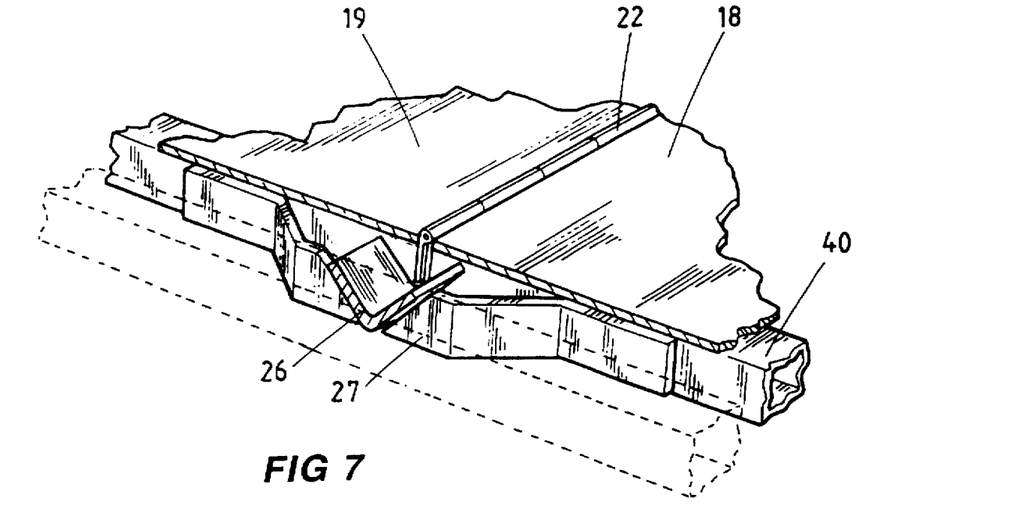
FIG. 7 is a partial underside perspective view of the cover of FIG. 6 when in a closed position.
Figure 8:
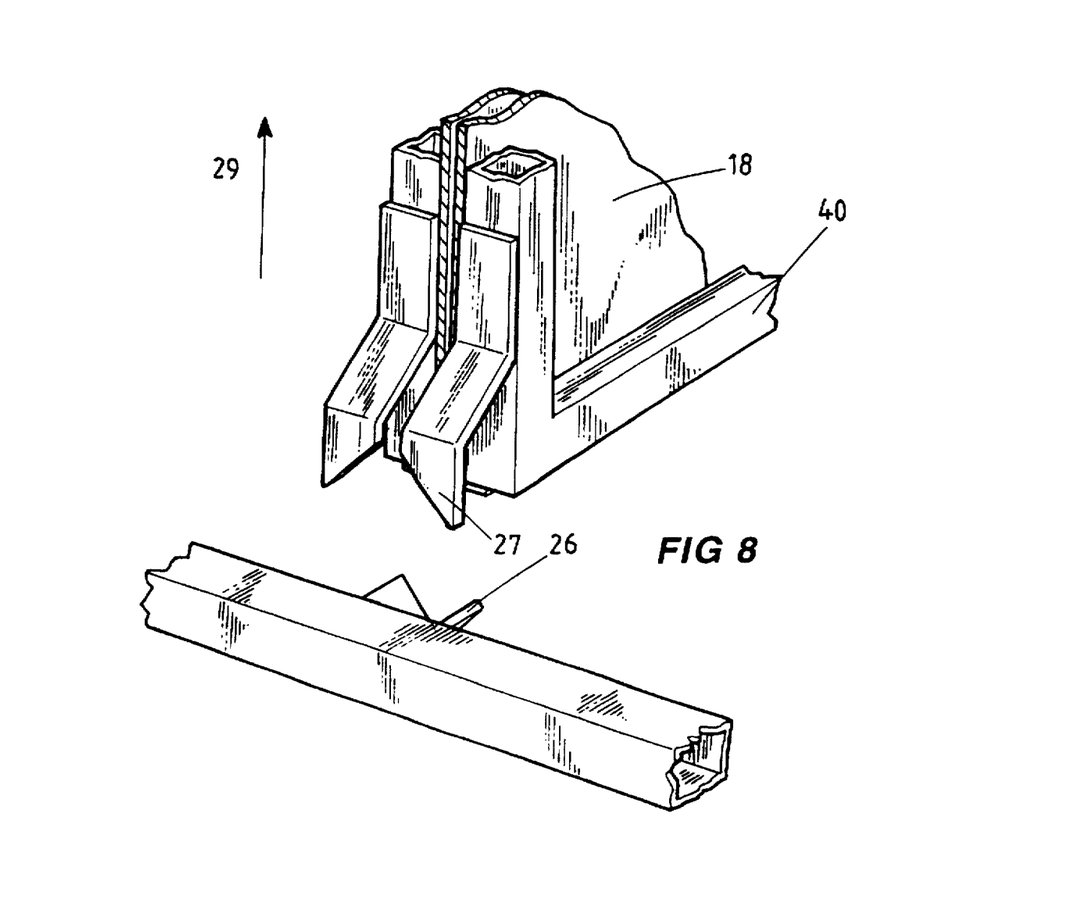
FIG. 8 is a partial underside perspective view of the cover of FIG. 6 when in an open position allowing its removal from the pick-up truck.

In FIGS. 7 and 8 the locking-lug insertable portions 27 are shown as extrusions attached to the supporting frame 40 and initially extending outwards in the direction of the hinge connection means before bending back to be parallel to the hinge connection means. This may be useful in the case where the walls defining the cargo area 11 have an inwardly overlapping lip (not shown) with the result that the receiving lugs 26 are covered by the overlapping lip and would not be accessible to the supporting frame 40 acting as locking-lug insertable portion 27. Where there is no inward overlapping means than the supporting frame 40 may so shaped to act as the locking-lug insertable portion 27, this shown in the first embodiment.

Thus one can see in that when the two panels 18, 19 are in a closed position the cover 10 can not be moved vertically. To move the cover vertically both leaves have to be substantially open. The cover is also vertically restrained even if one of the panels 18, 19 is open since both panels have independent restraining abilities and they are attached to each other via the hinge connection means. Of course it one of the panels were in an open position the cover could be moved by moving the closed leaf in a direction away from the restraining means if there were no supporting frame 40 or the equivalent as discussed before to prevent horizontal movement in general.

Therefore the non-vertical surface of the receiving lug is engaged by the mated shape of the locking-lug insertable portion 27 when a panel is in a substantially closed position to prevent the cover moving vertically.

Figure 11:
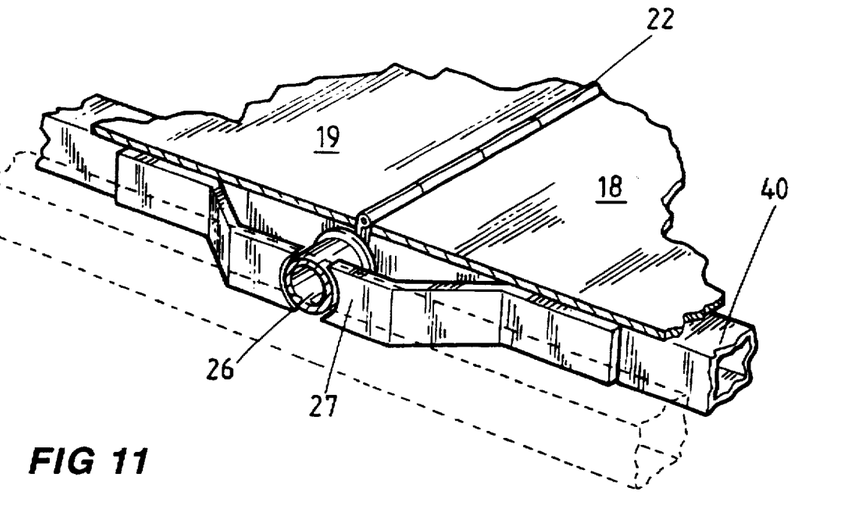
FIG. 11 is a partial underside perspective view of a third embodiment of a cover when in a closed position.
Figure 12:
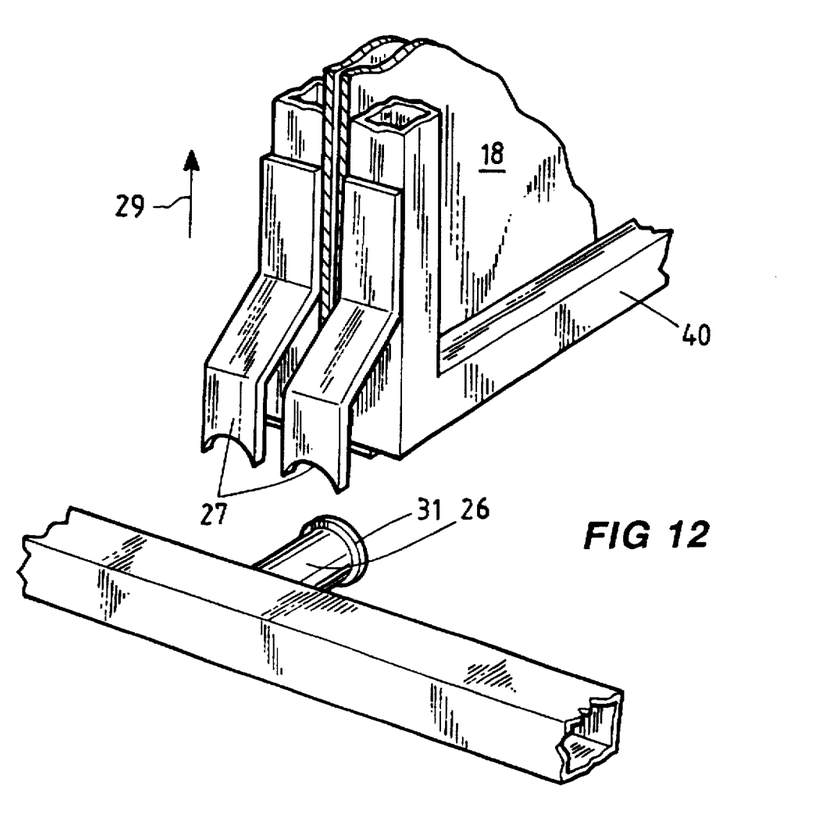
FIG. 12 is a partial underside perspective view of the cover of FIG. 11 when in an open position allowing its removal from the pick-up truck.

In the above two embodiments the basic shape of the receiving lug has been a triangular shape. However, it is not to be limited to that shape and besides triangular they may also be circular, hexagonal or any other shape provided that at least a portion of the receiving lug engaged by the locking-lug insertable portion includes a surface which is not vertical, with the receiving lug being correspondingly shaped. Therefore, as shown in a third embodiment of FIGS. 11 and 12 the receiving lug 26 may be of a circular shape with the locking-lug insertable portion 27 mated to that shape. This type of shape may also be advantageous for it not only prevents the cover from being moved (when in a closed position) vertically upwards, it also acts so as to prevent the cover from moving vertically downwards thus acting as an additional support if any weight is placed on top of the cover.

Figure 13:
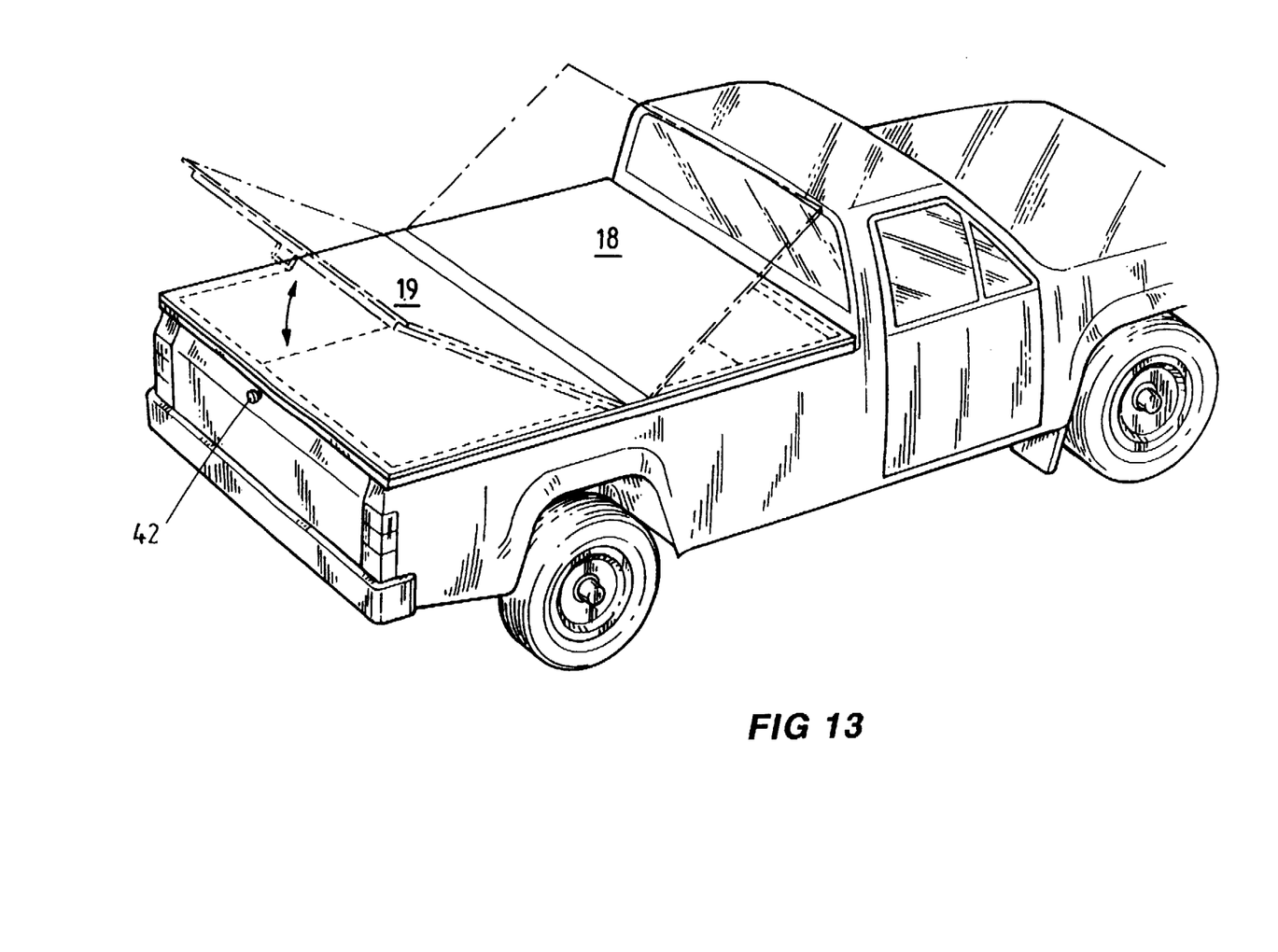
FIG. 13 is a perspective view of a fourth embodiment of a cover installed on a pick-up truck body when in a fully closed position and when in a partially open position (dashed lines), with a double hinge connection means running perpendicular to the longitudinal axis of the pick-up truck, the cover consisting of two panels.
Figure 14:
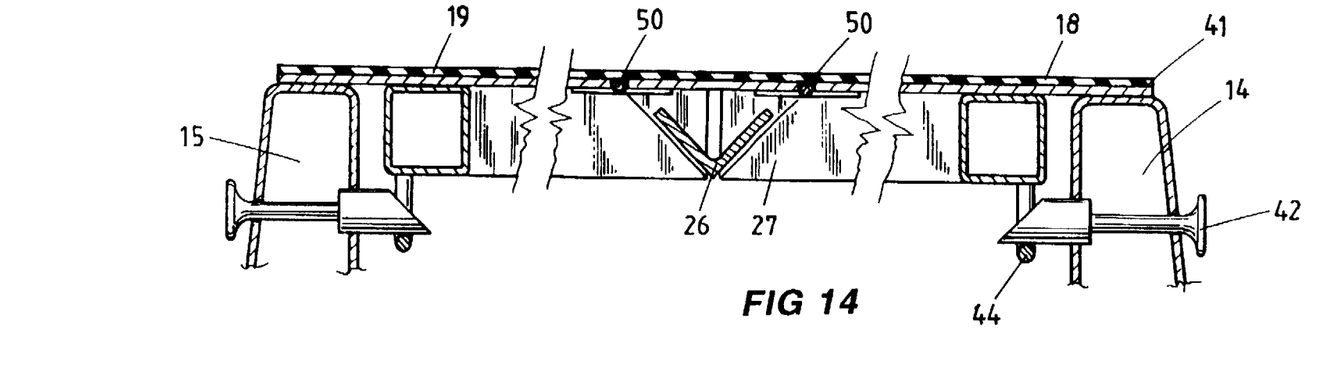
FIG. 14 is a cross-sectional view of the cover of FIG. 13 when in a closed position.
Figure 15:
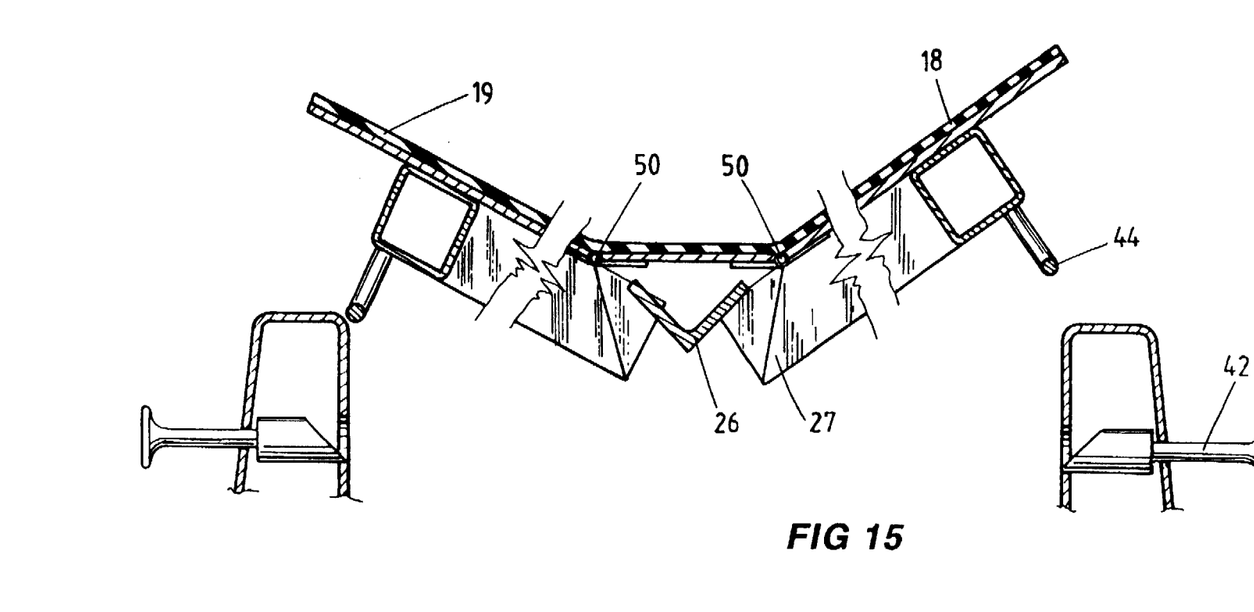
FIG. 15 is a cross-sectional view of the cover of FIG. 13 with both panels partially open.

As shown in the fourth embodiment of FIGS. 13–15 the hinge connection means may comprise of two hinges 50 that join the two panels. In this embodiment the two hinges 50 are joined to a small common panel or spine. The advantages of this arrangement is that when either one or both of the panels 18, 19 are in a fully open position (such as one panel fully opened so that it rests on top of the other panel) the hinge connection means 22 is not folded over an angle substantially up to 180 degrees. If two hinges are used in conjunction with a common panel 51, then the largest angle that may be expected for the cover is around 100 degrees. This feature is extremely useful if the cover 10 has an additional unbroken sheet of material 52 on top of the panels 18, 19 such as a waterproof vinyl sheet. The reduction in the maximum angle leads to less stress on the sheet 52 and thus a longer lifetime since constant changes in angle can lead to the deterioration of the sheet at the points where the most bending occurs.

The above prevents in the vertical and horizontal movement of the cover but is still not very secure for not only can the panels flap around if not restrained, the above arrangement does not prevent unauthorized access into the cargo area nor prevents the cover being stolen itself.

To aid in securing the cover to the truck there are a number of independent locking means for each panel, locking the panel to the wall on which its outside edge substantially rests on in the closed position. As shown above a simple pin 42 may be used to lock the panels in their closed position by engaging a catch 44 (U-channel) or other (like aperture 43 in frame 40) fixed to the panel. In these embodiments the pin 42 is shown accessible externally since it protrudes through the side wall. Although in some cases this may be quite satisfactory where the only concern is to prevent the panels from flapping it does not secure against theft. This may be solved by making the pin externally inaccessible and controllable say only from within the vehicle as is currently use for luggage compartments (also known as car boots) and bonnets. The pin could be controlled by numerous means such as cable or electromagnetic means and could be wholly contained within a side wall and not only externally inaccessible but also not externally visible.

There is another potential weakness in the security of the system as outlined above if the tailgate or side walls are not of a fixed construction and are themselves adapted to be openable. Unauthorized access may be gained by simply breaking the pin 42 or by opening one of the walls The latter is obvious when applied to trailers for there the tailgate 17 usually has no independent locking mechanism. To further secure against this threat the receiving lug thus has a lip 31 which engages the locking-lug insertable portion 27 and prevents movement of the cover 10 in the direction of the hinge connection means 22 and also prevents the tailgate 17 or side wall on which the receiving lug 26 is located from being opened when the cover 10 is in a closed position. Of course this needs both of the receiving lugs to have lip 31.

As an example, if the cover has two panels joined by a hinge connection means running in direction 23, and the cover is in a closed and restrained position than even if one were to break a lock on the tailgate 17, they could not open the tailgate and gain access to the cargo area 11 since the tailgate is fixedly attached to the cover through the lip 31 on the receiving lug positioned on the tailgate and the cover is fixedly attached to the front wall through the lip 31 on the receiving lug positioned on the front wall.

It is also to be understood that other arrangements besides a lip 31 may be used, the requirement being that the receiving lug 26 has a surface that is not parallel to the hinge connection means so that when it is engaged by the locking-lug insertable portion it does not simply slide off.

Figure 16:
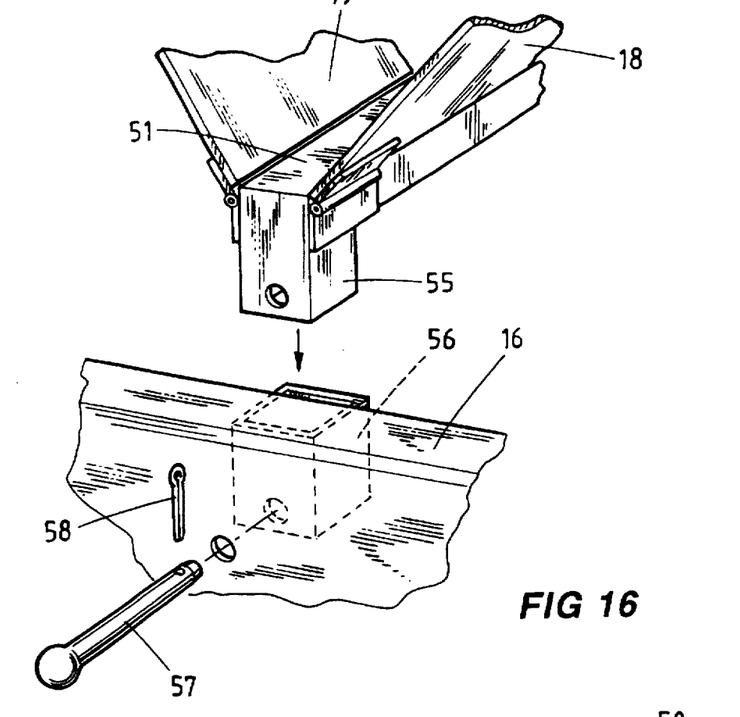
FIG. 16 is a partial perspective view of a fifth embodiment of a cover installed on a pick-up truck.

FIG. 16 shows a fifth embodiment of the invention where the first restraining means 25 comprises of a square channel 55 adapted to slidably engage a square receiving lug 56 which is a correspondingly shaped square channel into which slides the square channel 55. The two are locked in place by a pin 57 which may itself be securably held in position by a securing pin 58.

Figure 17:
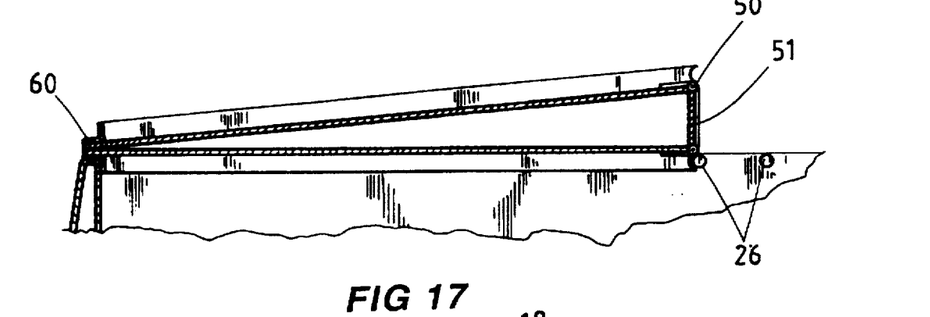
FIG. 17 is a side view of the cover of FIG. 13 in combination with other embodiments resulting in a cover with two leaves and two hinges with one of the leaves in a fully closed position and the other in a fully open position the cover including a right-angle support at the edges.
Figure 18:
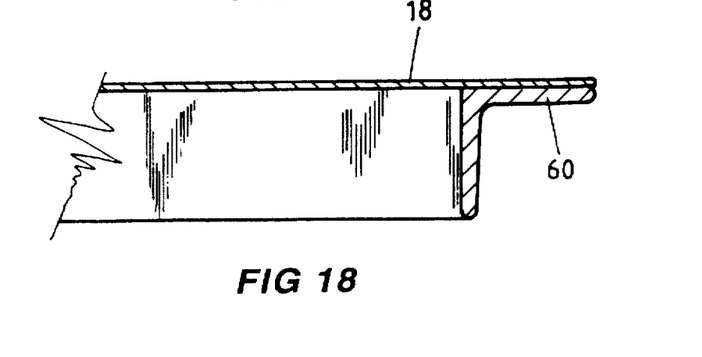
FIG. 18 is a detailed view of the right-angle support shown in FIG. 17.

FIGS. 17 and 18 show variations of the invention where the cover is supported by angle brackets 60 which are designed to sit on top of the four walls. Such an arrangement allows the panels to be made of a much lighter material since the angle brackets 50 act so as to support the weight with no danger of the outside edges of the panels bending as would be the case without the angle brackets 50.

Figure 19:
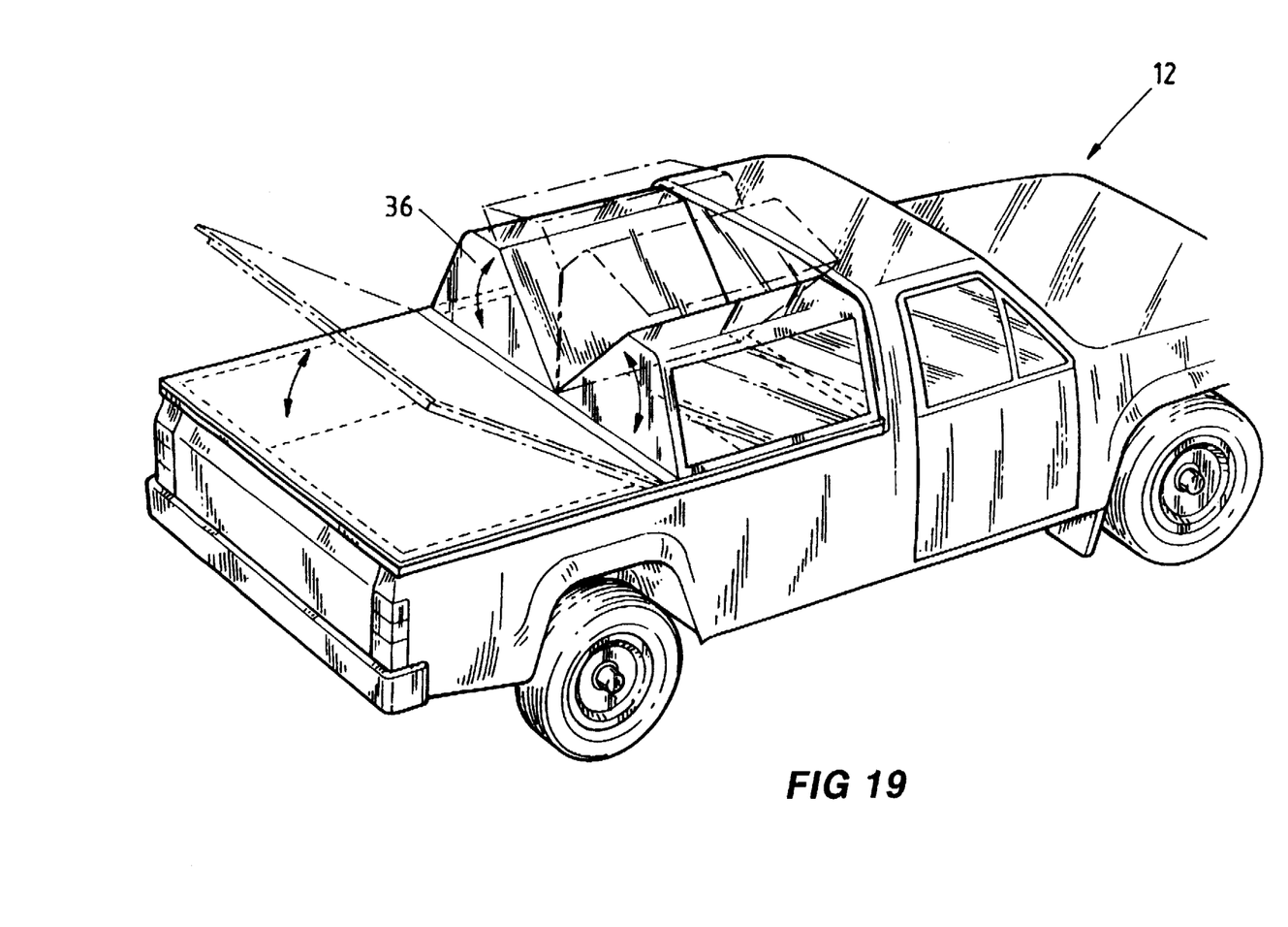
FIG. 19 is a perspective view of a cover with a combination of hinges and leaves allowing for a number of varying compartments.

Whilst the cover has been shown with two equal size panels this does not need to be the only case. Firstly, the panels of the cover may be of different sizes and there may be more than two panels which can be hinged in different orientations. As shown in FIG. 19, the leaves need not also be of a flat geometry but can have varying geometry, including vertical extension as per panel 36 thus increasing the enclosed protected cargo area.

Figure 20:
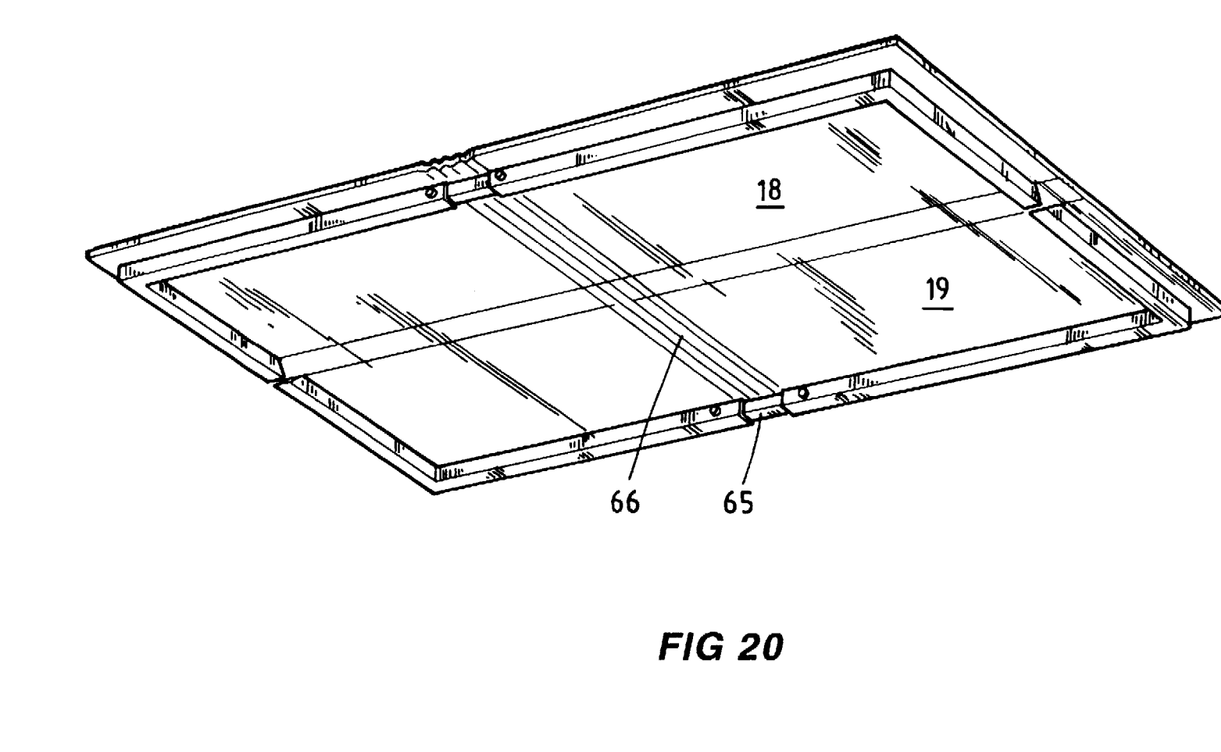
FIG. 20 is an underside view of a cover adapted to be adjustable in length.

It is also possible to construct a cover 10 which can be slightly compressed allowing it to be stored within the cargo bay. This may be done by having overlapping plates, multiple in-line hinges or telescopic extensions on the beams. the last variation shown in FIG. 20 where there is an extendible beam 65 adapted to slidably engage the supporting frame 40 of the two panels. In addition the cover 10 may include a compressible portion 66 which allows the cover to be extended and/or compressed, albeit over a small range, but sufficient to allow easier storage within the cargo area 11.

Figure 21:
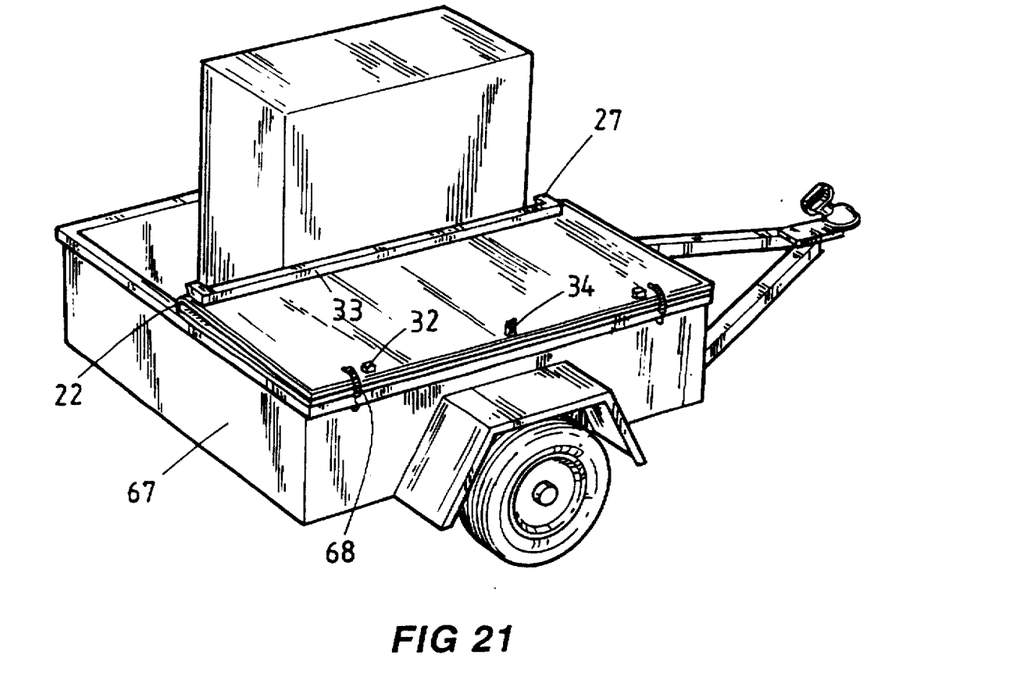
FIG. 21 is a perspective view of a cover with two panels when used on a trailer with one panel fully opened and locked on top of the other panel.
Figure 22:
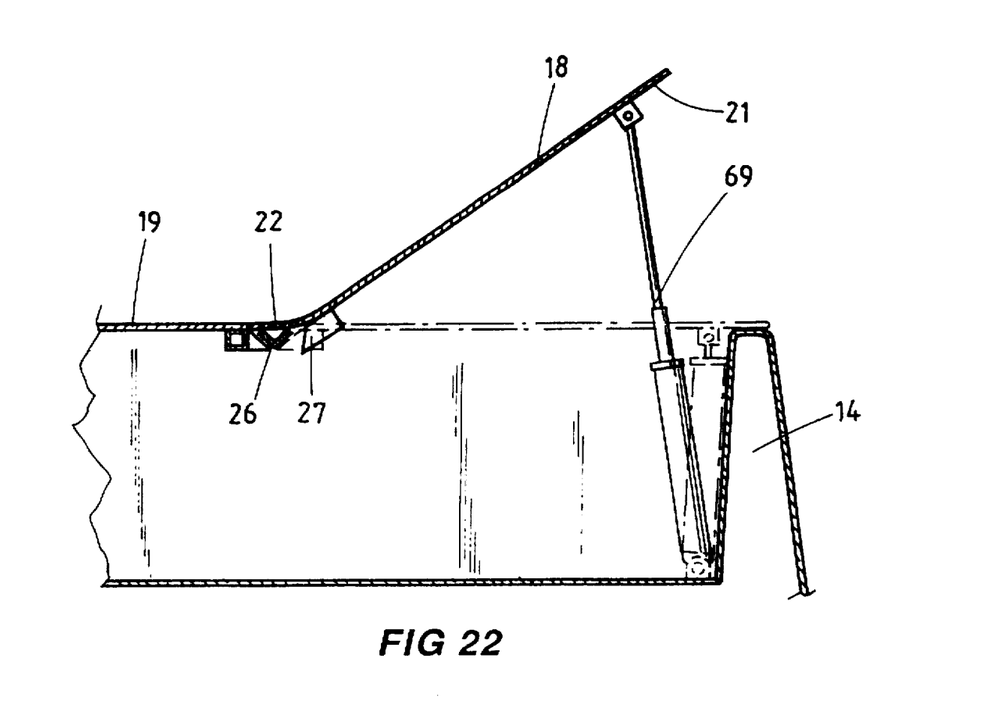
FIG. 22 is a cover combined with a gas strut that allows adjustable opening of the cover.

FIG. 21 shows the use of the cover on a trailer 67, the cover being in a half fully open position, one panel secured to the other by means of straps 68. It may also be desirable to enable each or both of the leaves to be held in an open position as shown in FIG. 22, in this case that being accomplished by use of a gas strut 69.

Thus it will be seen that this invention results in a cover which can provide protection not only for a cargo area against weather, vandalism and theft, but is itself substantially secure against theft and even vandalism. Furthermore, it allows partial access into the cargo bay area without fear of the other areas being exposed or the cover stolen. In addition it may provide extra security to walls which are themselves operable, such as the tail gate, so that even if someone were to break the lock or the tail gate they could not open it without breaking the restraining means.

Other variations to the invention may be made without deviating from the spirit of the invention. Thus, a plastic coating may be applied over the cover to assist in the waterproofing of the cover. This may be a typical polyurethane cover that may be sprayed over the panels and the hinge connection means and whose properties allow the panels to still be foldably moved with respect to each other without breaking the seal on the cover. Yet other embodiments may be apparent without deviating from the scope of the invention.

I claim:

1. A removable securable cover for use with a vehicle having an open cargo area defined by a tray and two pairs of substantially parallel side walls, said cover comprising:

two panels spanning across the cargo area so as to cover it, the panels spanning across the first pair of side walls with an outer edge of one panel resting on top of one side wall of the second pair of side walls and an outer edge of the other panel resting on top of the other one of the second pair of side walls;

a hinge connection means for hingedly connecting the two panels to each other at their adjacent inner edges opposite from said outer edges;

a securing means securing the outer edge of each panel to the side wall on which it is resting;

a restraining means engaging the cover so as to prevent it from moving in an upright direction unless both panels are lifted to provide an inclined angle therebetween;

whereby with both panels extending over the cargo area and secured the cover is securably attached to the vehicle, with one panel extending over the cargo area and secured in place the other panel can be folded open about the hinge connection means to expose at least a part of the open cargo area with the cover still securably attached to the vehicle, and whereby with both panels folded open about the hinge connection means and extending upwardly the cover may be removed from the vehicle.

2. A removable securable cover as in claim 1 wherein the restraining means comprises a receiving lug located on each of the first pair of side walls against which the hinge connection means abuts for receiving a locking-lug insertable portion having a bevelled portion and located at the extremes of the inner edge of each panel, the receiving lug having a mated bevelled entry portion for receiving said insertable portion.

3. A removable securable cover as in claim 2 wherein the bevelled portions cause upon restraining action to induce drawing down of the panels onto the four walls into a tight sealing that assists in sealing of the cargo area as well as inhibiting any rattling motion.

4. A removable securable cover as in claim 2 including a restricting means to restrict sliding of the cover when at least one of the panels is in a closed position.

5. A removable securable cover as in claim 4 wherein the restricting means includes a first restricting means engaging the cover when at least one of the panels extends over the cargo area so as to prevent it from sliding in a direction substantially parallel to the hinge connection means.

6. A removable securable cover as in claim 5 wherein the first restricting means comprises a lip on the receiving lug which engages a side of the locking-lug insertable portion when the panel extends over the cargo area.

7. A removable securable cover as in claim 5 wherein the restricting means further includes a second restricting means engaging the cover when at least one of the panels extends over the cargo area so as to prevent it from sliding in a direction substantially transverse to the hinge connection means.

8. A removable securable cover as in claim 7 wherein the second restricting means includes at least one projection extending downwardly from the outer edge of each panel so as to engage the inside of the wall on which the outer edge of the panel is resting and prevent the cover from sliding in a direction substantially transverse to the hinge connection means.

9. A removable securable cover as in claim 1 wherein the securing means is a key lock means for each panel to selectively lock the outer edge of the panel to the side wall on which it rests.

10. A removable securable cover as in claim 1 including sealing means extending circumferentially on the outer edges of the cover to seal the cover to the walls.

11. A removable securable cover as in claim 1 wherein the hinge connection means comprises two hinges, one hinge being attached to the first panel and the other hinge to the second panel, said hinges being attached to each other through a third panel.

12. A securable removable cover as in claim 1 wherein the hinge connection means is a rubber strip.

13. A securable removable cover for use with a vehicle such as a pick-up truck having an open cargo area defined by a tray and four walls, the four walls being two side walls, a front wall and a tailgate, said cover corresponding substantially in size to the width and length of the open cargo area, the securable removable cover comprising:

at lease two panels pivotally joined to each other by at least one hinge connection means, the two panels extending across said open cargo area so as to enclose it, each of the at least two panels adapted so that at least a portion of it rests on top of at least one of the four walls when in a fully closed position said at least two panels being further adapted to be lockable by a locking means to at least one of the walls that each is resting on when in a fully closed position; and a restraining means positioned on at least one of the four walls in line with the at least one hinge connection means and adapted to restrain the cover from moving in a vertical direction when at least one of the panels is in a fully closed position, said cover being only vertically movable when all of the panels are in a substantially open position.

14. A securable removable cover as in claim 13 wherein the locking means is not externally accessible from outside of the pick-up truck.

15. A securable removable cover as in claim 13 wherein the cover further includes supporting beams on the underside of the cover so positioned to fit in the internal perimeter of the cargo area so as to prevent the cover from sliding around in the horizontal plane or the plane of the cover.

16. A securable removable cover as in claim 13 wherein the cover is a sheetlike material including edges and further includes angle brackets fixedly attached to the outside underside perimeter of each panel that are adapted to rest on top of a corresponding top edge of a wall, so as to reduce the strength required on the edges of the cover and thus the thickness of the cover.

17. A securable removable cover as in claim 13 wherein the cover further includes a second restraining means so as to prevent the cover from moving in a direction substantially in line with the hinge connection means.

18. A securable removable cover as in claim 13 wherein each panel is pivotally connected to a central plate so as to reduce the maximum angle of any fold.

* * * * *